United States Patent [19]

Nunn

[11] 4,306,848
[45] Dec. 22, 1981

[54] INJECTION MOLDING APPARATUS HAVING LOW SHEAR SCREW

[75] Inventor: Robert E. Nunn, Marion, Ohio

[73] Assignee: HPM Corporation, Mount Gilead, Ohio

[21] Appl. No.: 208,854

[22] Filed: Nov. 21, 1980

Related U.S. Application Data

[63] Continuation of Ser. No. 41,801, May 23, 1979, abandoned.

[51] Int. Cl.$^3$ .............................. B29F 1/02; B29F 1/12
[52] U.S. Cl. ...................................... 425/208; 264/73; 264/75; 366/323
[58] Field of Search ...................... 425/208; 264/73, 75; 366/323

[56] References Cited

U.S. PATENT DOCUMENTS

| 3,169,275 | 2/1965 | Compton et al. | |
| 3,230,902 | 1/1966 | Grimm et al. | 425/208 |
| 3,518,721 | 7/1970 | Rukas et al. | |
| 3,689,184 | 9/1972 | Morse | 425/208 X |
| 3,841,814 | 10/1974 | Eckhardt | 425/208 |
| 3,876,188 | 4/1975 | Koch et al. | 425/208 X |
| 3,945,786 | 3/1976 | Bishop | 425/208 |
| 4,052,038 | 10/1977 | Brand | 366/90 |
| 4,125,582 | 11/1978 | Langlois | 264/73 |
| 4,183,673 | 1/1980 | Easley et al. | 366/323 X |

FOREIGN PATENT DOCUMENTS

| 618536 | 2/1949 | United Kingdom | 425/208 |
| 2004804 | 4/1979 | United Kingdom | 264/75 |

Primary Examiner—Thomas P. Pavelko
Attorney, Agent, or Firm—Gust, Irish, Jeffers & Hoffman

[57] ABSTRACT

A method and apparatus for the injection molding of plastics material wherein the forward portion of the screw is designed such that mixing and shear of the material is minimized. This is advantageous when processing materials having diverse colorations so as to produce a mottled product, and also for processing glass reinforced materials wherein high shear processing would break the fibers thereby resulting in a lower quality product. Low shear processing of the material in the forward portion of the barrel is accomplished by providing a screw having a fully flighted rear portion, but a forward portion which is flightless so that a generally unobstructed, annular flow passage is formed between the cylindrical outer periphery of the flighted portion and the inner wall of the barrel. In a mottling application of the apparatus, materials of diverse coloration are softened by the flighted rear portion of the screw but not yet fully mixed so that distinct color patterns are present. When the material reaches the unflighted portion, it will be forced forwardly by the forward pressure developed as the screw continues to pump material forwardly, but the only shear imparted thereto is the gentle wiping action produced by the inner wall of the barrel and the outer periphery of the unflighted portion of the screw so that the streaked condition of the material remains intact. In the case of glass reinforced materials, the circumferential wiping action produced by the unflighted section of the screw aids in wet-out.

9 Claims, 3 Drawing Figures

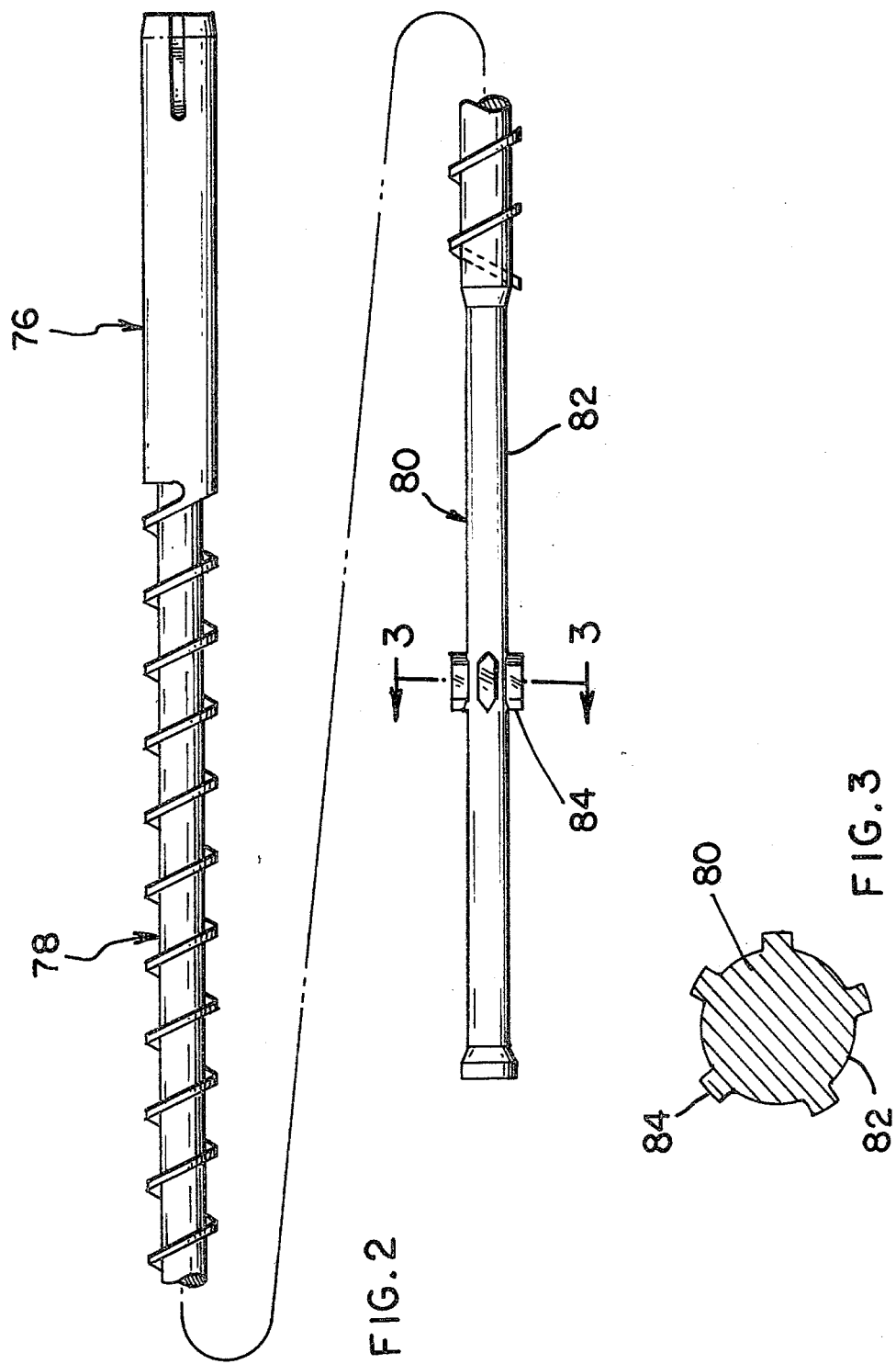

INJECTION MOLDING APPARATUS HAVING LOW SHEAR SCREW

This is a continuation of application Ser. No. 041,801, filed May 23, 1979 now abandoned.

BACKGROUND OF THE INVENTION

The present invention relates to a method and apparatus for injection molding plastics materials under low shear conditions in the forward portion of the barrel. More specifically, the invention relates to a method and apparatus for producing articles having a mottled appearance, and for processing glass reinforced materials.

In order to produce mottled plastic articles having streaks of diverse colors or shades so as to simulate the appearance of marble or wood, two or more materials having different colors may be processed simultaneously in an injection molding machine. Although the materials must be softened sufficiently to enable them to be molded, they must not be blended to the point that the diverse colors are no longer distinguishable in the end product. In many cases, the different materials have different melt viscosities so that there results a very poor distribution of the materials as they are melted, and this produces a streaked finish appearance. Although the different viscosities impede good mixing, if the materials undergo a sufficient amount of shear, they will be mixed to the point that the final color will be a combination of the two starting colors and there will be no mottled appearance whatsoever.

An early injection molding technique which was satisfactory for producing mottled articles comprises an injector unit of the type having a barrel and plunger disposed therein for reciprocating movement. The barrel is heated, as by heating bands which circle the outer periphery thereof, and by inserting molding materials of different colors ahead of the plunger and then advancing the plunger, the materials are displaced toward the discharge orifice of the barrel. Contact with the heated surface of the barrel causes the materials to soften so that they are capable of conforming to the molding surfaces. Since this type of apparatus does not perform much mixing on the material, it was necessary to preblend the material before introducing them into the barrel.

The type of injection molding apparatus in wide use today comprises an elongated barrel having a screw which extends longitudinally therein. The screw has a helical land on its surface which moves relative to the internal surface of the barrel so as to work the plastics material and feed it toward the outlet end of the barrel. In order to inject the material, the screw is advanced forwardly toward the discharge opening so as to force the softened material into the mold cavity.

One characteristic of screw-type injection molding machines is that a high degree of shear energy is imparted to the material so that intense mixing occurs during feeding as the screw rotates. In the case of processing materials having diverse colorations so as to produce a mottled product, this intense mixing completely blends the two materials so that distinct color patterns, such as streaks, are destroyed.

Conventional preciprocating screw-type injection molding machines can be utilized for molding mottled products, but it is necessary to use a screw which induces minimal mixing of the molten plastic. This can be achieved by using a short screw having a length to diameter ratio (L/D) of 13:1, for example, but in the normal situation where an injection molding machine is used for other applications which require a longer barrel, such as a barrel having an L/D of 26:1, economic considerations often do not warrant the expense of purchasing a separate barrel just to run mottled parts. It would be advantageous, therefore, to have the flexibility to run both mottled parts and parts requiring a longer L/D barrel without the necessity of stocking two barrels and completely converting the machine when switching from one to the other.

One solution to the problem of enabling mottled parts to be run with a conventional barrel is disclosed in U.S. Letters Patent 3,945,786, which is owned by the assignee herein. This injection molding machine comprises a conventional length barrel having a screw therein which is disposed in the rear portion of the barrel so that a substantial distance is present between its tip and the discharge opening. A spreader device is positioned within a heated portion of the bore ahead of the feed screw, and as the screw is rotated to feed and soften molding materials of diverse coloration and is subsequently translated forwardly, the softened and partially blended materials are pushed through the spreader device such that final plasticization occurs. Since the length of the flighted, rotating screw is relatively short, the materials of diverse colorations are discharged from the screw in a softened condition, but not blended to the point that the distinct color patterns are lost.

One problem with the mottling apparatus disclosed in U.S. Pat. No. 3,945,786 is that the conventional barrel is designed such that it will hold full injection pressure within defined safety limits only in the front portion thereof. When the shortened screw retracts rearwardly of the portion of the barrel designed to hold full injection pressure, the injection pressure therein during forward translation of the screw would exceed safety limits and may be sufficient to burst the barrel. This required the use of a longer screw than was optimum.

The present invention is also applicable to the molding of glass reinforced materials, such as BMC, where breakage of the glass fibers is a problem when excessive shear is performed on the material. Although a certain degree of shear is inevitable if the material is to be conveyed forwardly by the rotating screw, if a low shear environment can be provided for the material after sufficient pumping pressure has been developed, then an improved product would result. As in the case of mottling, the use of a short screw would tend to minimize shear, but the excessive pressures within the intermediate portion of the barrel during the injection stroke would cause the barrel to burst.

SUMMARY OF THE INVENTION

The present invention overcomes the above-discussed disadvantages and problems of the prior art apparatus and methods by providing an injector unit wherein low shear processing of the material takes place in the forward portion of the screw so that the unit can be used for mottling and glass reinforced materials. This is achieved by a modified screw having a fully flighted rear portion and a forward portion which is unflighted and preferably of a smaller diameter than the root diameter of the flighted section of the screw. Consequently, the material undergoes very little shear in the unflighted section so that the condition of the material leaving the unflighted section is very similar to that entering it, except that its temperature could be raised or lowered by heating or cooling, depending on the requirements dictated by the particular application. The ability to transfer heat to or from the barrel in the unflighted section is advantageous, because the desired temperature of the material as it exits the barrel can be very precisely controlled without the complicating factors resulting from a screw in the forward portion performing mechanical work on the material.

By utilizing in a conventional barrel a screw having a subtanatial portion of its length, for example, twenty-five percent to fifty percent or greater, which is unflighted, the screw behaves like a shorter screw yet without the problems of excessively high injection pressures rearwardly of the forward section of the barrel. As discussed in the previous section, barrels are conventionally constructed such that they will tolerate the high injection pressures only in the forward portion of the barrel, and if a shorter screw is used, the area of high pressure is extended rearwardly to a position in the barrel that is not capable of withstanding it.

Such an injector unit is particularly advantageous when processing two or more materials of diverse colors in a conventional barrel because the heating and shear imparted to the materials as it is conveyed forwardly by the flighted, rear portion of the screw is sufficient to soften the materials and partially blend them so that distinct color patterns are present. As the partially blended, softened materials are pumped forwardly through the annular chamber between the flightless section of the screw and the inner wall of the barrel, little additional mixing will take place, although the material can be further heated or cooled by the extraction or giving up of heat to the heated or cooled barrel. Since the screw in total length is matched to the length of the barrel using conventional design criteria, the high injection pressures developed forwardly of the screw are confined to the forward portion of the barrel, which is constructed so as to be capable of withstanding them.

Specifically, the present invention contemplates an injection molding machine for injecting plastics material into a walled cavity comprising a barrel having an inner wall and a discharge opening at the forward end of the barrel, a screw longitudinally received in the barrel, and rotation means operably connected to the screw to rotate the same. The screw includes conveying means on the rear portion thereof to displace the material forwardly as the screw is rotated, and low shear means on the forward portion of the screw to permit the material displaced forwardly by the conveying means to flow between the inner wall of the barrel and the screw forwardly of the screw with a minimal amount of mixing of material and with a minimal amount of shear energy being imparted to the material by the screw. The low shear means comprises an unflighted portion of the screw defining an annular passageway between the barrel inner wall and the screw forward portion and extending along a substantial portion of the length of the barrel. Translation means operatively connected to the screw drives the screw forwardly relative to the barrel to displace the softened material through the discharge opening and into the mold cavity.

When used in a mottling environment wherein materials of diverse coloration are to be mixed and then injected into the mold cavity, the materials are displaced forwardly by the screw in a softened condition, but short of a fully blended condition, so that distinct color patterns are present. The softened, partially blended material flows along the unflighted portion of the screw with minimal mixing and shear so that when the material is injected into the mold, it has retained its distinct color patterns and a mottled article will result.

The present invention also contemplates the use of the apparatus described above to process glass reinforced materials such as glass reinforced polyester thermosets. The conveying zone of the screw, which is the flighted portion, accepts material from the feed opening and generates sufficient pressure to force material along the unflighted section of the screw and through the non-return valve. In the unflighted, low shear zone, areas of localized high shear are absent so that a minimum amount of fiber degradation occurs. The relative movement between the rotating screw and the inner wall of the barrel produces, however, a gentle circumferential mixing which aids wet-out of the material. The invention permits a long screw to process glass reinforced polyesters and other material, since the flighted conveying zone can be kept short. Thus, conventional length injection molding barrels can be utilized for the injection molding of this type of material.

Specifically, the present invention contemplates a method for injection molding particles of fiber reinforced plastics material comprising: providing a barrel having a discharge opening at the forward end thereof and an inner wall, providing a screw in the barrel comprising a rear flighted portion and a forward unflighted portion adjacent the flighted portion, feeding glass reinforced plastics material into the barrel to the flighted portion of the screw, rotating the screw to displace the materials forwardly into an annular passage defined between the barrel and the unflighted portion of the screw, flowing the material through the annular passage and forwardly of the screw with a gentle, circumferential mixing action and with a minimum amount of shear so that breakage of the fibers in the material is minimized, and translating the screw forwardly to displace the material in front of the screw through the discharge opening.

BRIEF DESCRIPTION OF THE DRAWINGS

FIG. 2 is an elevational view of a modified screw adapted for use with glass reinforced plastics material; and FIG. 3 is a sectional view taken along line 3-3 and viewed in the direction of the arrows.

DETAILED DESCRIPTION

Figure 1:
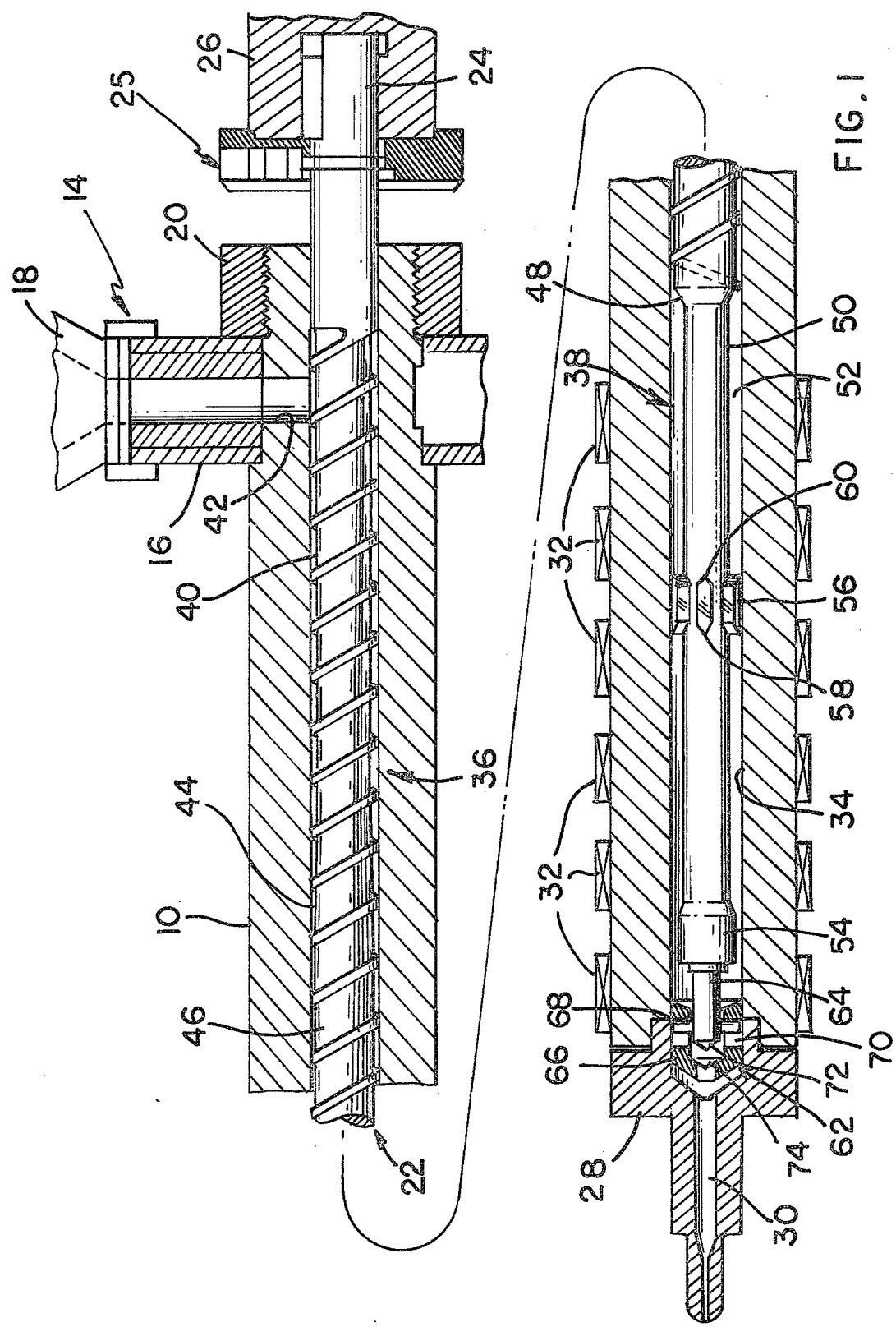
FIG. 1 is a longitudinal sectional view of part of an injection molding machine in accordance with the present invention and adapted for mottling.

Referring now to FIG. 1, there is illustrated an injection molding machine constructed in accordance with the present invention and particularly adapted for injecting materials of diverse coloration into a mold cavity (not shown) wherein the final product will have a mottled appearance. The machine comprises an injector barrel 10 having connected thereto a material feed unit 14 comprising a feed chamber 16 and a hopper 18. A large lock nut retains barrel 10 and feed unit 14 in assembled position.

Longitudinally received within barrel 10 for rotational and translational movement is a screw 22 modified in accordance with the present invention. The rear portion 24 of screw 22 extends through ram stop 25 into injection ram 26, and is keyed to ram 26 so that it can be rotated thereby. A nozzle 28 is secured to the forward end of barrel 10 and includes a discharge passage 30 therein through which the molten plastics material is injected into the mold cavity (not shown). Heater bands 32 encircle barrel 10 at selected locations and serve to maintain the inner wall 34 of barrel 10 at the desired temperature so as to further heat and melt the plastics material before it is injected into the mold. For certain types of materials, it is necessary to cool barrel 10 rather than heat it, in which case cooling fluid would be circulated through barrel 10. With the exception of the modification to screw 22 which will be described below, the injection molding machine described above is of conventional construction.

Screw 22 is of integral construction and comprises an unflighted rear portion 24 having a diameter approximately equal to the inner diameter of barrel 10, a fully flighted feed, transition and metering section 36, and an unflighted, low shear section 38. The fully flighted section 36 includes a feed section 40 having generally constant channel depth and communicating with the throat 42 of feed chamber 16. Adjacent feed section 40, is the transition section 44 wherein the channel depth decreases in a continuous fashion up to the shallow channel depth present in the metering section 46. In conventional injection molding machines, a screw having the feed, transition and metering sections just described is not uncommon, except that these sections would together constitute the entire screw rather than just the rear portion as in the case of the present invention.

At the forward end of the metering section 46 is a tapered shoulder 48 which provides an abrupt transition from the larger diameter root of the metering section to the smaller diameter outer surface 50 of unflighted, low shear section 38. The outer surface 50 of section 38 and the inner wall 34 of barrel 10 together define an annular passageway 52 extending from metering section 46 to the forward end 54 of screw 22. Since the material pumped forwardly by the flighted section 36 of screw 22 flows through a generally unobstructed annular passageway 52, it undergoes very little shear so that mixing and mechanical working of the materials are held to a minimum. It is desirable that the diameter of the unflighted, shaft section 38 of screw 22 be as small as possible without exceeding the compressive strength limits dictated by the injection pressure.

In order to support the unflighted section 38 within barrel 10, it may be desirable to provide bearings 56, which are in the nature of radially extending ribs having tapered forward and rear ends 58 and 60, respectively. In some cases, and depending on the length of unflighted section 38, bearings 56 may not be necessary. It is desirable that bearings 56 be kept as short and narrow as possible within the screw structural constraints so that mixing of the material flowing past them will be minimized. Even with the presence of bearings 56, however, the annular passageway 52 between metering section 46 and the forward end 54 of screw 22 is generally unobstructed.

Attached to the forward end 54 of screw 22 is an annular non-return valve 62, which is designed to prevent the backflow of material during injection. The non-return valve 62 comprises a retainer 64 threadedly secured to the forward end 54 of screw 22, a check ring 66 received over retainer 64, and retainer pin 68 extending through retainer 64 and received within a pair of slots 70 in check ring 66. By virtue of slot 70, check ring 66 can reciprocate relative to retainer 64 so that the nose 72 of retainer 64 will seat against the correspondingly tapered seat 74 of check ring 66 during the injection stroke, thereby preventing rearward flow of material through valve 62. During the feeding cycle, check ring 66 will be pushed forwardly by the forward pressure of the material pumped by screw 22, so that material can flow through valve 62.

In operation, pelletized plastics material of two or more different colors are fed into barrel 10 by feed unit 14, and they are conveyed forwardly by the threaded, rear section 36 of screw 22. As the materials are pumped forwardly by the feed, transition and metering sections 40, 44 and 46, respectively, they are partially melted to a softened state and partially mixed so that the material which enters the annular passageway 52 defined by the unflighted section 38 and the inner wall 34 of barrel 10 has distinct color patterns therein, which appear as streaks of one of the materials in the other. This is due to the fact that the two materials have not completely melted and are poorly mixed and, if injected into the mold at this point, would result in an article having a mottled appearance.

The barrel 10, however, is substantially longer than the flighted section 36 of screw 22 and, to avoid excessively high pressures within the forward portion of barrel 10, a screw the length of the flighted section 36 is not practical. In order to apply injection pressure to the materials further forward in barrel 10, screw 22 includes unflighted section 38 so that the softened, poorly mixed materials can flow forwardly in barrel 10 through annular passageway 52 under low shear conditions. The materials are pumped forwardly due to the forward pressure produced by additional material being pumped by the flighted section 36 of screw 22. Except for the relatively small amount of agitation produced by bearings 56, the only mechanical working of the materials is that caused by the relative rotation between the outer, cylindrical surface 50 of unflighted section 38 and the circular inner wall 34 of barrel 10. Since this action is relatively gentle, very little additional mixing of the materials results.

As screw 22 rotates, the softened, poorly mixed materials are further heated by the heat produced by heating bands 32 so as to bring the materials to the desired final temperature and viscosity. Because the forward portion of screw 22 is not flighted, the additional complicating factor of additional heating of the materials produced by shear is not present, and easier control of the final melt temperature and viscosity can more easily be controlled, simply by controlling the temperature of barrel 10.

The materials flow around the forward end 54 of screw 22, through valve 62 and build up pressure in front of screw 22 thereby causing it to retract. Since very little additional mixing of the materials occurs in annular passageway 52, the material accumulating in front of screw 22 will retain distinct color patterns, appearing as streaks of one material within the other. When the desired charge has been accumulated from the screw 22, it is translated forwardly by injection ram 26 thereby injecting the poorly mixed, molten materials through injection passage 30 into the mold cavity.

Although the dimensions of screw 22 will depend on the particular materials being injected and on the size of barrel 10, the following dimensions may be considered exemplary. Screw 22 has a length to diameter ratio of 26:1, a feed section 40 which is 35.0 in. in length, a transition section 44 which is 10.5 in. in length, and a metering section 46 which is 3.5 in. in length. The channel depth for feed section 40 is 0.433 in., and for metering section 46 is 0.25 in. The length of unflighted section 38 is 44.7 in. and the outer diameter thereof is 2.38 in. Bearings 56 are 2.5 in. in length, 0.62 in. in width, and the outer diameter of the bearing portion is 3.49 in.

As discussed previously, the injection molding machine according to the present invention can be used to inject glass reinforced materials, such as glass reinforced polyesters. A screw 76 suitable for this purpose is illustrated in FIG. 3 and comprises a long feed section 78 having a generally constant channel depth, which is slightly deeper than the channel depth of screw 22. The unflighted section 80 of screw 76, like screw 22, has a cylindrical outer surface 82 and includes bearings 84 integral therewith. With the exception of the fact that the flighted section 78 does not include transition and metering sections 44 and 46, respectively, screw 76 is essentially identical to screw 22. Of course, the various dimensions, including the length of the unflighted section 80 relative to the flighted section 78, may be modified depending upon the particular application.

Due to the fact that the unflighted section 80 produces very little shear on the thermoset material, breakage of the glass fibers can be minimized, and wet-out will be enhanced by the gentle circumferential mixing which takes place at the inner wall 34 of the barrel 10.

As the material is pumped forwardly, screw 76 will retract, and when the desired charge has been accumulated, the screw 76 will be translated forwardly so as to displace the thermoset material into the mold (not shown).

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An injection molding machine in which materials of diverse coloration are to be mixed and then injected into a mold cavity to form an article of mottled coloration, said machine comprising:
   a barrel having a discharge opening at the forward end thereof;
   a screw longitudinally received in said barrel, said screw having a front end and rear end,
   rotation means operably connected to said screw to rotate said screw to displace the materials forwardly of said screw in a softened condition but short of a fully blended condition so that distinct color patterns are present,
   translation means operatively connected to said screw to produce translation of said screw relative to said barrel to displace the softened materials through said discharge opening,
   said screw comprising a flighted conveying portion and an unflighted portion of substantial length forwardly of said flighted portion and adjacent the front end of the screw, said unflighted portion having a generally cylindrical periphery along nearly its entire length so as to define a generally unobstructed annular flow passage between the barrel and cylindrical periphery of said unflighted portion adated to produce a minimal amount of mixing and shear on the material flowing therethrough so that the material displaced forwardly of the screw will not be fully blended, said screw unflighted portion including a bearing portion comprising a plurality of circumferentially displaced radial ribs adapted to partially support said screw in said barrel, said ribs being positioned intermediate the screw front end and the flighted portion of the screw.

2. The injection molding machine of claim 1 wherein the diameter of said unflighted portion of said screw is less than the diameter of the root of the flighted portion of said screw.

3. The injection molding machine of claim 1 wherein said unflighted portion is at least twenty-five percent as long as said flighted portion.

4. The injection molding machine of claim 1 wherein said unflighted portion is at least fifty percent as long as said flighted portion.

5. The injection molding machine of claim 1 including non-return valve means connected to the front end of said screw.

6. An injection molding machine for injecting plastics material into a mold cavity comprising:
   a barrel having a discharge opening at the forward end thereof,
   a screw longitudinally received in said barrel, said screw having a front end and a rear end,
   rotation means operatively connected to said screw to rotate said screw to displace plastics material forwardly of said screw,
   translation means operatively connected to said screw to produce translation of said screw relative to said barrel to displace the plastics material through said discharge opening,
   said screw comprising a flighted conveying portion and an unflighted conveying portion of substantial length forwardly of said flighted portion and adjacent the front end of said screw, said unflighted portion having a generally cylindrical periphery along nearly its entire length so as to define a generally unobstructed annular flow passage between the barrel and cylindrical periphery of said unflighted portion adapted to produce a gentle wiping action with a minimal amount of shear on the plastics material flowing therethrough,
   said screw having a feed section and the diameter of said unflighted portion being less than the diameter of the root of said feed section.

7. The injection molding machine of claim 6 wherein said barrel includes a feed inlet communicating with the flighted portion of said screw, said flighted portion is immediately adjacent said unflighted portion, and said flighted portion has a substantially constant root between said feed inlet and said unflighted portion.

8. An injection molding machine for injecting plastics material into a mold cavity comprising:
   a barrel having an inner wall and a discharge opening at the forward end thereof,
   a screw longitudinally received in said barrel, said screw having a front end and a rear end,
   rotation means operatively connected to said screw to rotate said screw,
   said screw including conveying means on the rear portion thereof to displace the material forwardly as the screw is rotated, said screw including low shear means on the forward portion thereof to permit the material displaced forwardly by the conveying means to flow between the inner wall of the barrel and the screw forwardly of the screw with a minimal amount of mixing of material and with a minimal amount of shear being imparted to the material by the screw, said low shear means comprising an unflighted portion of said screw defining an annular passageway between the barrel inner wall and the screw forward portion and extending along a substantial portion of the length of said barrel, and translation means operatively connected to said screw to produce translation of said screw relative to said barrel to displace the softened material through said discharge opening, said screw including a feed section on the rear portion thereof, and the diameter of the unflighted portion is less than the diameter of the root of the feed section.

9. The injection molding machine of claim 6 wherein said screw unflighted portion includes a bearing portion comprising a plurality of circumferentially displaced radial ribs adapted to partially support said screw in said barrel, said ribs being positioned intermediate the screw front end and the flighted portion of the screw.

* * * * *